United States Patent [19]  
Calandra

[11] 4,013,097  
[45] Mar. 22, 1977

[54] APPARATUS AND METHOD FOR DAMMING A PIPELINE

[76] Inventor: Anthony Louis Calandra, 5809 Betty Drive, Savannah, Ga. 31406

[22] Filed: Oct. 10, 1975

[21] Appl. No.: 621,535

Related U.S. Application Data

[63] Continuation of Ser. No. 484,211, June 28, 1974, abandoned.

[52] U.S. Cl. .................................. 138/93; 138/97
[51] Int. Cl.² ........................................ F16L 55/12
[58] Field of Search ................... 138/93, 37, 97, 98, 138/99, 131, 134; 4/255, 256

[56] References Cited

UNITED STATES PATENTS

| | | | |
|---|---|---|---|
| 1,158,595 | 11/1915 | Voorhees | 138/131 |
| 1,605,782 | 11/1926 | Rota | 138/98 |
| 1,760,750 | 5/1930 | Goodman | 138/93 |
| 1,814,677 | 7/1931 | Fennema | 138/93 |
| 3,834,422 | 9/1974 | Larson | 138/93 |

Primary Examiner—Richard E. Aegerter  
Assistant Examiner—L. Footland  
Attorney, Agent, or Firm—Curtis, Morris & Safford

[57] ABSTRACT

An apparatus useful in damming the flow of fluid through a pipeline is shown. The apparatus comprises an inflatable bladder encompassed within a flexible, expandable outer bag made of a rubber-like material. The bladder and bag are separated by an annular zone filled with a viscous fluid. The bladder is attached by means of an umbilical tube and suitable valving to a source of pressurized fluid. In use, the apparatus is positioned within a section of pipeline upon which repairs are to be made and the bladder is inflated forcing the outer bag, through the medium of the viscous liquid, to be forced into tight, sealing contact with the interior surfaces of the conduit in which the apparatus is positioned. The apparatus is inexpensive and portable and may be used to seal off sections of pipeline from larger systems without requiring extended or costly shutdowns.

2 Claims, 3 Drawing Figures

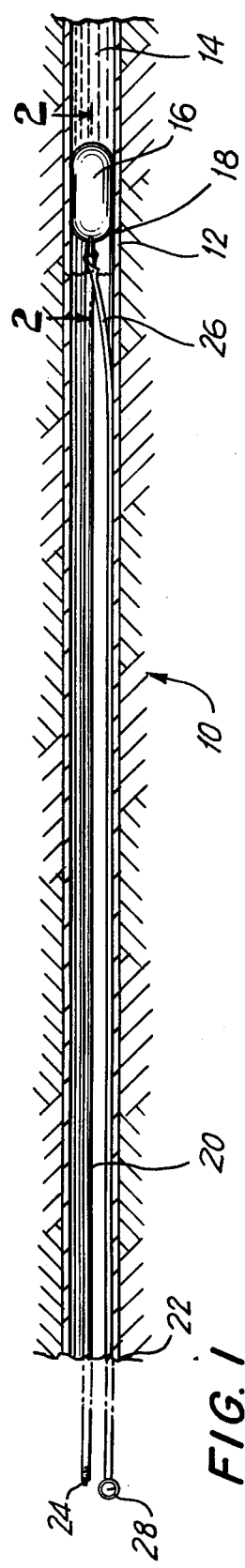
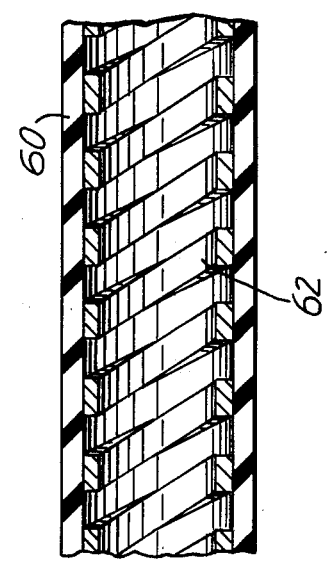
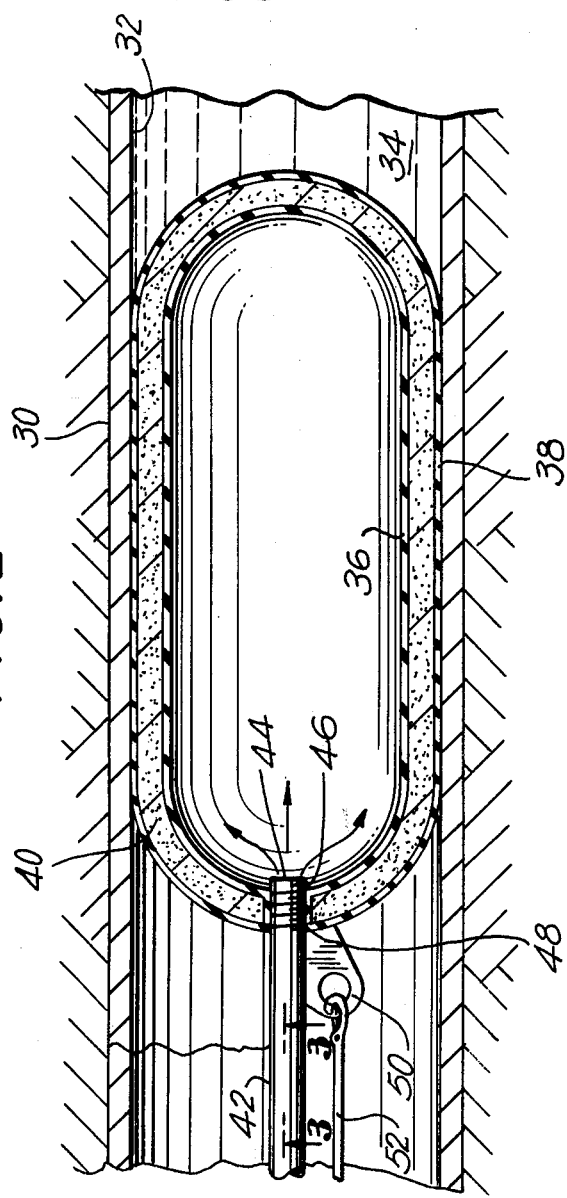
FIG. 1
FIG. 3
FIG. 2

APPARATUS AND METHOD FOR DAMMING A PIPELINE

This is a continuation, of application Ser. No. 484,211, filed June 28, 1974, now abandoned.

This application relates to an apparatus and to a method for damming the flow of fluid through a conduit. More specifically, this application is directed to an apparatus and method which may be used to seal off the flow of fluid through a pipe while sections downstream of the seal are repaired.

When repairing pipelines that are in service, it is customarily necessary to seal off the work zone from further flow of fluid. In the repair of pipelines carrying water, petroleum products or any other materials, it is unacceptable to perform welding or similar operations upon a section of pipe-line, until the section of pipe being worked on is completely sealed off from other parts of the piping system which may contain fluids. In many instances although upstream valves can be closed or entire sub-sections of a piping system shut down, it is not possible to completely isolate the repair section of the pipeline from exposure to continuous or transient streams of the fluid in the system. This is particularly true in utility systems carrying natural gas or the like which contain complex systems of pipelines. In order to avoid dangerous work conditions and the risk of explosions or interference with repair operations, it is therefore typically necessary to shut down entire utility systems or to employ expensive and time consuming techniques to isolate the work zone.

It is thus the primary objects of this invention to provide an apparatus which will inexpensively and reliably seal off a section of pipeline from exposure to the fluids passing through connected pipelines or pipeline systems.

It is a further object of this invention to provide an apparatus which is portable and may be used in different size pipes without requiring special skills.

It is still a further and related object of this invention to provide an apparatus for damming the flow of fluid through a conduit having a variable pressure-seal characteristic, so that it may be used in different types of pipelines to seal off fluids at different pressures.

It is yet a further object of this invention to provide an apparatus and a method which reduces the necessity of sealing off large areas of pipeline systems and reduces the necessity of shutting down such systems to work on one area of pipeline.

These and other objects of this invention are achieved in an apparatus which includes an inflatable bladder and an umbilical tube attached thereto adapted to pass pressurizing fluid to and from the bladder. In its broadest concept the apparatus includes only a bladder, preferably of tough rubber material, which is inflatable with compressed air or nitrogen and which has attached to it a length of rubber tube having at its end remote from the inflatable bladder, valving means for introducing and releasing the pressurizing fluid.

In the preferred embodiment the inflatable bladder is encompassed within a flexible, expandable outer bag and a viscous liquid material is provided in the annular space between the bladder and the bag. Both the inflatable bladder and the outer bag are made of rubber or a suitable polymeric material and both are sized so that when the bladder is inflated, the outer surface of the bag will flexibly conform to and seal tightly against the interior surface of a pipe into which the assembly has been positioned. The umbilical tube, which may desirably be comprised of an inner, flexible and hollow metal cable covered by rubber, is attached to the bladder and at its end remote from the bladder, it includes a valve for introduction and release of a pressurizing fluid, typically compressed air. Any suitable valve assembly may be used, including a common bicycle tire valve. The umbilical tube also includes a pull chain or lanyard which is connected at one end to the outer bag, preferably at a reinforced grommet, and which extends generally parallel with the umbilical tube to a remote location. In order to extend the usefulness of the apparatus, the umbilical tube may be formed from a series of sections which may be attached to one another by suitable threaded connections, so as to extend the length of the umbilical tube and thereby permit positioning of the bladder and bag assembly at considerably greater distances from an access point within a pipeline.

The viscous substance in the annular zone between the bladder and the outer bag may be either a solution or a suspension of polymer in water, a latex composition or any other material having viscous flow characteristics. A suitable composition is, for example, aqueous methylcellulose. The annular zone filed with viscous fluid performs the function of transmitting pressure uniformly from the bladder to the outer bag so that the outer surface of the bag is forced into tight, sealing contact with the interior surfaces of the conduit, no matter what the shape of that conduit, or the interior surface condition thereof.

The apparatus and the method for using it are further disclosed in connection with the drawings. IN THE DRAWINGS:

FIG. 1 is a section view of the apparatus positioned within a pipeline;

FIG. 2 is an enlarged section view of the apparatus taken along lines 2—2 of FIG. 1; and FIG. 3 is a detail section view showing a preferred construction of the umbilical tube, taken along lines 3—3 of FIG. 2.

In FIG. 1 reference 10 refers to a steel pipeline, although the invention embraces apparatus and method for sealing conduits made of concrete, plastic or other materials. Reference 12 identifies a break in pipeline 10 which is to be repaired by welding. Reference 14 identifies fluid within pipeline 12 which is sealed off from the work zone 12 by means of the apparatus of this invention identified by reference 16. As shown in FIG. 1 the apparatus includes an inflatable structure identified by reference 18 and an umbilical tube 20 which extends from the inflatable part of the apparatus to the access point to pipeline 10, identified by 22. At the end of umbilical tube 20 is a standard valve 24 which permits control of the flow of a pressurizing fluid to and from the inflatable part of the apparatus. Reference 26 identifies a lanyard which is connected to the inflatable part of the apparatus by means of a reinforced grommet and which extends parallel with the umbilical tube to the access point where it terminates in a pull ring 28.

In FIG. 2 reference 30 identifies the steel pipe and reference 32 identifies the interior surface thereof. Reference 34 depicts the fluid in pipe 30 which is sealed off by means of the apparatus of this invention. The inflatable part of the apparatus is comprised of a rubber bladder 36 and in annular relation thereto, an outer bag 38. In the annular zone between the bladder 36 and the outer bag 38 is a viscous liquid 40. The umbilical tube is depicted by reference 42 and as shown, it communicates at 44 with the inflatable bladder 36. Both bladder 36 and outer bag 38 are tightly sealed against umbilical tube 42 at 46 and 48 respectively. Although the shape of the inflatable bladder and outer bag is shown as generally extended ellipsoid, the shape may be any other suitable shape to conform to the interior configuration of a pipeline.

Reference 50 identifies a reinforced grommet which is attached to outer bag 38 as well as to the first part of umbilical tube 42. Attached by a suitable eye member to grommet 50 is pull-lanyard 52 which as shown in FIG. 1 extends generally parallel with the umbilical tube to the access point of the pipeline, 22.

With reference to FIG. 3, 60 identifies an outer rubber tubing and 62 identifies a hollow, metal cable such as BX cable. It will be understood by those skilled in the art that the umbilical tube 42, when constructed according to the configuration of FIG. 3 or other suitable configuration can be made more or less stiff so as to facilitate introducing the inflatable part of the apparatus into a pipeline from an access point. After the apparatus is positioned, a pressurizing fluid, typically compressed air, is introduced via valve 24 and umbilical tube 42 and the inflatable bladder is inflated, forcing viscous liquid 40 outwardly against outer bag 38 and causing the latter to be tightly sealed against interior surfaces 32 of pipeline 30. After the work is completed on work zone 12, the pressurizing fluid may be released from the inflatable part of the apparatus via valve 24 and the apparatus may be removed from pipeline 10 by pulling on lanyard 52. In one preferred embodiment of the invention the lanyard 52 is incorporated within the umbilical tube 42.

What is claimed is:

1. A puncture-resistant apparatus for temporarily damming, in its expanded configuration, the flow of fluid through a conduit of predetermined size to permit repairs to be made downstream of said apparatus, and being adapted to be passed into and out of said conduit in a collapsed condition, comprising the elements of: (a) a flexible, expandable outer bag having an ellipsoidal shape in its expanded configuration, the distance between elongate sides thereof being equal to or greater than the interior diameter of said conduit of predetermined size, said outer bag being formed of rubber or polymeric material and being adapted to flexibly conform to and seal tightly against a length of the interior surface of said conduit; (b) an inner, inflatable bladder having an ellipsoidal shape in its expanded configuration, the distance between elongate sides thereof being less than the interior diameter of said conduit of predetermined size, said inner inflatable bladder being substantially concentrically disposed within said outer bag so as to create an annular space between said bladder and bag and being formed of rubber or polymeric material; (c) a pressure transmitting liquid in the said annular space defined between said outer bag and inner bladder, said pressure transmitting liquid consisting essentially of water and a viscosity increasing agent; (d) an umbilical tube attached to said bladder adapted to convey pressurizing air to and from said bladder, said umbilical tube comprising a length of flexible tubing communicating at one end with said bladder and including valve means at the end remote from said bladder for controlling passage of pressurizing air; and (e) a lanyard for pulling the apparatus from said conduit of predetermined size, said lanyard being connected at one end thereof to said outer bag and extending along said umbilical tube to the end thereof remote from said bag.

2. An apparatus as recited in claim 1, wherein said pressure transmitting liquid comprises aqueous methyl cellulose.

* * * * *